United States Patent
Kim et al.

(10) Patent No.: US 9,524,412 B2
(45) Date of Patent: Dec. 20, 2016

(54) LIGHTING APPARATUS, LIGHTING SYSTEM AND METHOD OF REGISTERING LIGHTING APPARATUS

(71) Applicant: LG INNOTEK CO., LTD., Seoul (KR)

(72) Inventors: Yull Oh Kim, Seoul (KR); Do Gyun Kim, Seoul (KR); Chan Young Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/338,101

(22) Filed: Jul. 22, 2014

(65) Prior Publication Data

US 2015/0028096 A1 Jan. 29, 2015

(30) Foreign Application Priority Data

Jul. 25, 2013 (KR) ........................ 10-2013-0088341

(51) Int. Cl.
*G06K 7/14* (2006.01)
*H05B 37/02* (2006.01)
*G06K 19/06* (2006.01)

(52) U.S. Cl.
CPC ....... *G06K 7/1439* (2013.01); *G06K 19/06028* (2013.01); *G06K 19/06037* (2013.01); *H05B 37/0209* (2013.01); *H05B 37/0272* (2013.01)

(58) Field of Classification Search
CPC ............ G06K 7/1439; G06K 19/06028; G06K 19/06037; H05B 37/0272; H05B 37/0209
See application file for complete search history.

(56) References Cited

U.S. PATENT DOCUMENTS

| | | |
|---|---|---|
| 2009/0318146 A1 | 12/2009 | Mizukoshi |
| 2010/0238001 A1 | 9/2010 | Veskovic |
| 2012/0133303 A1* | 5/2012 | Campbell et al. ............ 315/312 |
| 2012/0185384 A1 | 7/2012 | Pederson |
| 2012/0230698 A1 | 9/2012 | Park et al. |

FOREIGN PATENT DOCUMENTS

| | | |
|---|---|---|
| EP | 2051494 A1 | 4/2009 |
| EP | 2498550 A1 | 9/2012 |
| EP | 2533615 A2 * | 12/2012 |
| JP | 2005-183050 A | 7/2005 |

OTHER PUBLICATIONS

European Search Report in European Application No. 14178383.7.

* cited by examiner

*Primary Examiner* — Kristy A Haupt
(74) *Attorney, Agent, or Firm* — Saliwanchik, Lloyd & Eisenschenk

(57) ABSTRACT

Disclosed are a lighting apparatus, a lighting system and a method of registering a lighting apparatus to easily and conveniently register the lighting apparatus. The lighting system includes a lighting apparatus in which identification information to identify a unique address is recorded on an outer surface of a body of the lighting apparatus; and a lighting registering apparatus which reads out the identification information recorded on the outer surface of the body of the lighting apparatus to obtain the unique address information of the lighting apparatus, and matches the obtained unique address information with location information of the lighting apparatus to perform a register of the lighting apparatus.

14 Claims, 7 Drawing Sheets

LIGHTING APPARATUS, LIGHTING SYSTEM AND METHOD OF REGISTERING LIGHTING APPARATUS

CROSS-REFERENCES TO RELATED APPLICATION

This application claims the benefit under 35 U.S.C. §119 of Korean Patent Application No. 10-2013-0088341, filed on Jul. 25, 2013, which is hereby incorporated by reference in its entirety.

BACKGROUND

Technical Field

Generally, a lighting apparatus is controlled by a switch.

The switch is wire-connected to the lighting apparatus and is manually operated to transmit a control signal for turning on or off the lighting apparatus to the lighting apparatus.

However, when the lighting apparatus is controlled by using the switch as described above, the patient, the senior citizen or the infirm who cannot move freely, or children who cannot reach the switch may feel inconvenience when turning on or off the lighting apparatus.

Meanwhile, recently, the market in wireless control that wirelessly controls lights of an office or a store in a large building or home has been increased. A communication module is required to be installed in the lighting apparatus to wirelessly control the lighting apparatus.

In order to control a specific lighting apparatus among a plurality of lighting apparatus, a light control signal must be wirelessly transmitted to a communication module which is installed to the specific lighting apparatus through a gateway.

In this case, a user must know the place and of the specific lighting apparatus (which will be controlled) and a unique address (for example, MAC address) of the communication module installed in the specific lighting apparatus among the plurality of lighting apparatus.

Thus, in the related art, when a new lighting apparatus is to be installed, sequential processes of confirming an installation place of the new lighting apparatus and a unique address of a communication module installed in the new lighting apparatus, matching the installation place with the unique address and registering the new lighting apparatus are performed.

The process of registering the lighting apparatus is performed by confirming the unique address of the communication module installed in the new lighting apparatus and manually inputting the confirmed unique address by a light installer.

However, if the installer makes the mistake of inputting an incorrect unique address of the lighting apparatus, the lighting apparatus which a user intends to control may not be controlled but another lighting apparatus may be controlled. In this case, since the user does not know the unique address of the lighting apparatus which a user intends to control, the user cannot control the lighting apparatus.

Therefore, in order to correct the incorrectly input unique address of the lighting apparatus, after the lighting apparatus installed on a ceiling is dismantled and the unique address is confirmed from the communication module installed in the lighting apparatus, the process of registering the confirmed unique address of the lighting apparatus must be performed again.

In addition, according to the related art, even when a lighting apparatus previously installed at a place is moved at another place, a new lighting apparatus is additionally installed, or an installed lighting apparatus is dismantled, the same problems described above are caused.

BRIEF SUMMARY

The embodiment provides a lighting apparatus, a lighting system and a method of registering a lighting apparatus to easily and conveniently register the lighting apparatus.

Meanwhile, the technical objects accomplished by the embodiments may not be limited to the above object, and other technical objects of the embodiment will be clearly understood by those skilled in the art from the following description.

According to the embodiment, there is provided a lighting apparatus including a lighting unit receiving a control signal to emit light according to the control signal; and an identifying unit disposed on an outer surface of the lighting unit to represent an unique address information of the lighting apparatus.

The identifying unit includes at least one of a bar code and a quick response code formed on the outer surface of the lighting unit.

The lighting apparatus further includes a communication module which is physically separable from the lighting unit, wherein the communication module receives the control signal transmitted from an outside and transfers the control signal to the lighting unit.

The identifying unit is disposed on an outer surface of the communication module physically separable from the lighting unit.

The communication module receives a dimming signal transmitted from an outside for confirming a register of the lighting apparatus and transfers the dimming signal to the lighting unit, and the lighting unit performs a dimming operation according to the dimming signal transmitted from the communication module.

Meanwhile, according to the embodiment, there is provided a lighting system including a lighting apparatus in which identification information to identify a unique address is recorded on an outer surface of a body of the lighting apparatus; and a lighting registering apparatus which reads out the identification information recorded on the outer surface of the body of the lighting apparatus to obtain the unique address information of the lighting apparatus, and matches the obtained unique address information with location information of the lighting apparatus to perform a register of the lighting apparatus.

The lighting registering apparatus displays a map including location information about an entire space where the lighting apparatus is installed, receives a selection of a location of the lighting apparatus to be registered on the displayed map, and confirms location information of the lighting apparatus according to the selected location.

The lighting registering apparatus generates and stores register information of the lighting apparatus including the confirmed location information of the lighting apparatus and the unique address obtained from the lighting apparatus.

The lighting registering apparatus further includes a communication unit to transmit the stored register information to a gateway apparatus.

The gateway apparatus transmits a signal for confirming whether the lighting apparatus is normally registered by using the register information to the lighting apparatus, and the lighting apparatus performs a dimming operation by a signal transmitted from the gateway apparatus.

The lighting apparatus includes a lighting unit receiving a control signal to emit light according to the received control signal, and an identifying unit disposed on an outer surface of the lighting unit to represent identification information for identifying the unique address.

The identifying unit includes at least one of a bar code and a quick response (QR) code formed on an outer surface of the lighting unit.

The lighting apparatus further includes a communication module which is physically separable from the lighting unit, receives the control signal transmitted from an outside when the lighting apparatus is coupled to the lighting unit, and transfers the received control signal to the lighting unit.

The identifying unit is disposed on an outer surface of the communication module physically separable from the lighting unit.

The lighting registering apparatus photographs or scans the identifying unit of the lighting apparatus to read out information about the unique address of the lighting apparatus.

Meanwhile, according to the embodiment, there is provided a method of registering a lighting apparatus. The method includes obtaining identification information for identifying information about a unique address of the lighting apparatus recorded on an outer surface of the lighting apparatus; extracting information about the unique address of the lighting apparatus by using the obtained identification information; and matching the information about the extracted unique address with information about a location at which the lighting apparatus is installed in order to register the lighting apparatus.

The method further includes displaying a map including location information about an entire space where a plurality of lighting apparatuses are installed, and selecting the location at which the lighting apparatus is installed, wherein the information about the location where the lighting apparatus is information about a location selected on the map.

The lighting apparatus includes a lighting unit to emit light; and a communication module physically separable from the lighting unit and selectively detachable from the lighting unit, wherein the identification information is recorded on an outer surface of the communication module.

The method further includes transmitting register information of the lighting apparatus to a gateway apparatus, wherein the register information includes the information about the unique address of the lighting apparatus and the information about the location at which the lighting apparatus is installed.

The method further includes transmitting a register confirmation signal from the gateway apparatus to the lighting apparatus by the transmitted register information; and performing a dimming operation by the lighting apparatus according to the transmitted register confirmation signal.

DETAILED DESCRIPTION

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further, it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

Hereinafter, a lighting system will be described with reference to FIGS. 1 to 5.

Figure 1:
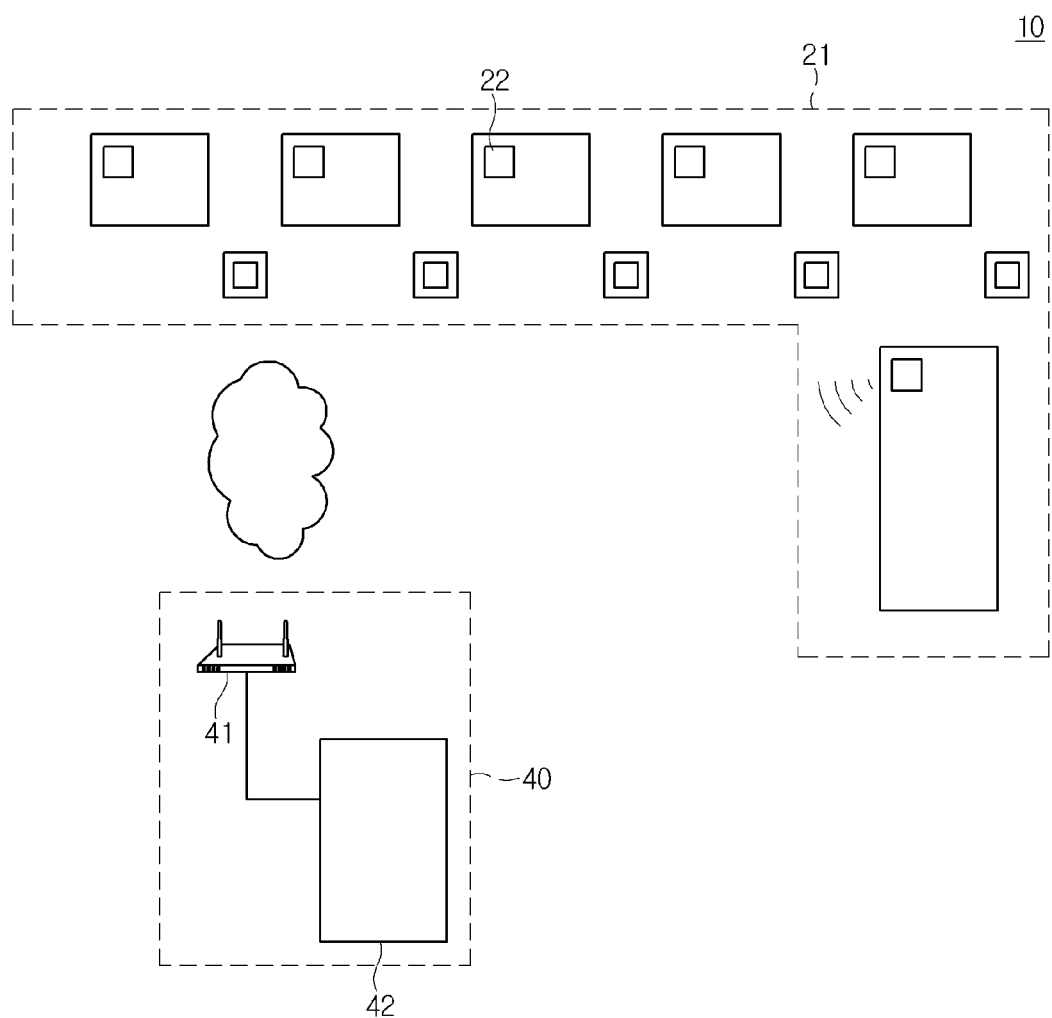
FIG. 1 is a view showing a lighting system according to an embodiment.
Figure 2:
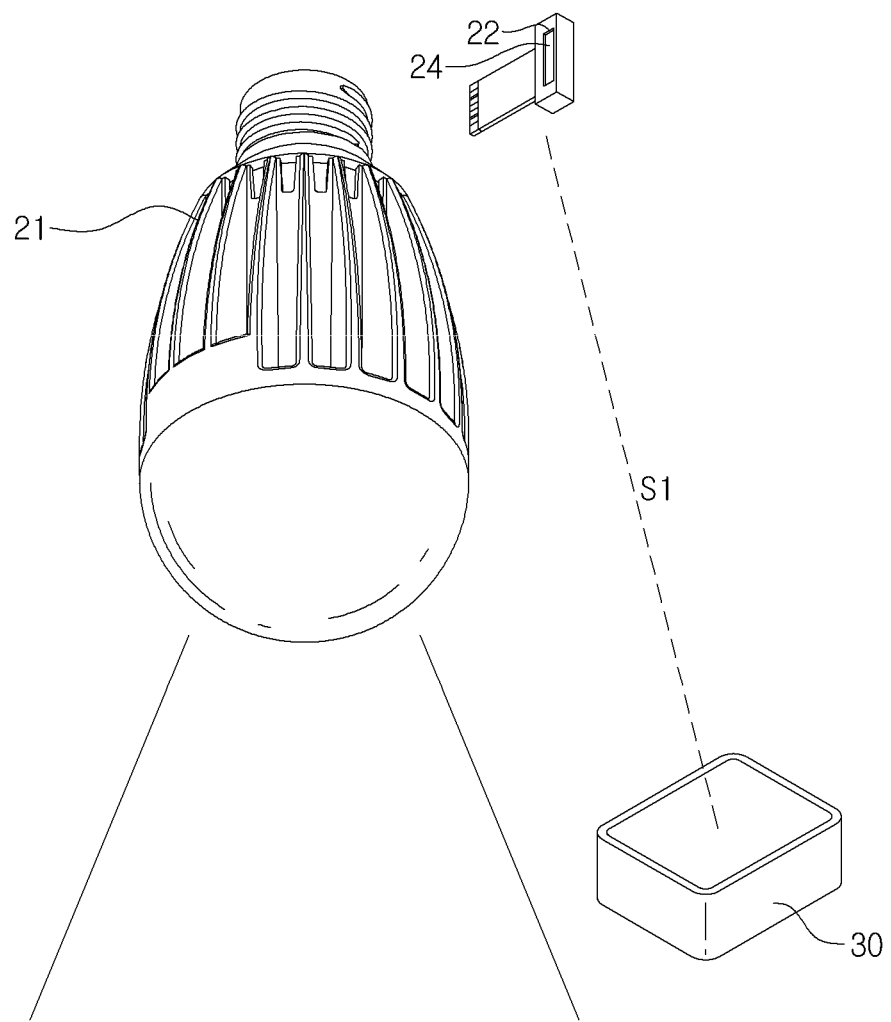
FIG. 2 is a view illustrating a register of the lighting apparatus of FIG. 1.
Figure 4:
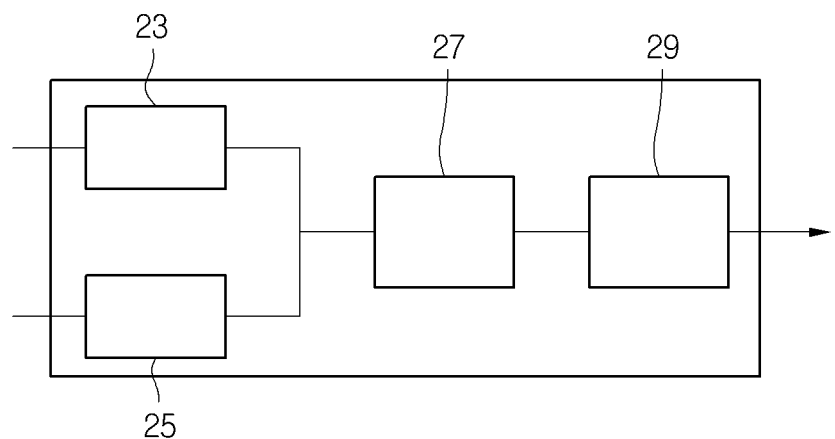
FIG. 4 is a block diagram showing a receiver according to an embodiment.
Figure 5:
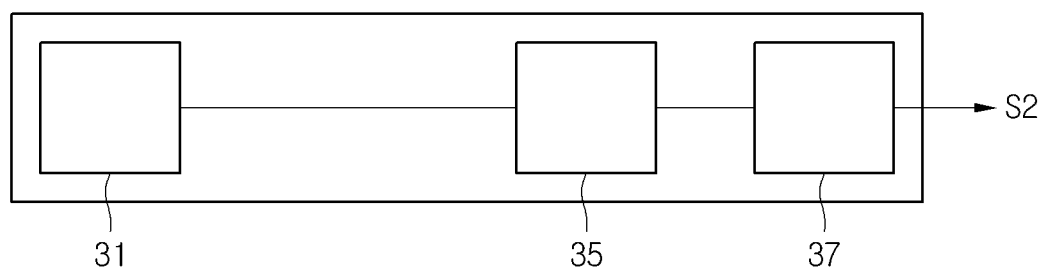
FIG. 5 is a block diagram showing a lighting apparatus according to an embodiment.

FIG. 1 is a view showing a lighting system according to an embodiment. FIG. 2 is a view illustrating a register of the lighting apparatus of FIG. 1. FIG. 3 is a view illustrating a code of the lighting apparatus of FIG. 2. FIG. 4 is a block diagram showing a receiver according to an embodiment. FIG. 5 is a block diagram showing a lighting apparatus according to an embodiment.

The lighting system 10 includes a gateway system 40 and a lighting apparatus 21. The lighting apparatus 21 may be plural.

As shown in the drawings, the gateway system 40 is connected to a light control apparatus (not shown) through an external communication network. In this case, the light control apparatus may include a portable terminal which transmits a control signal for controlling the lighting apparatus 21 according to an operation signal of a user.

In addition, the gateway system 40 is connected to the lighting apparatus 21 through an internal communication network.

The gateway system 40 interfaces data transmitted/received between the light control apparatus and the lighting apparatus 21 connected to each other through the external communication network.

The lighting apparatus 21 may be plural and eleven lighting apparatus 21 are depicted in the embodiment. However, the number of the lighting apparatus 21 is not limited thereto, and may be increased or decreased.

The lighting apparatus 21 are connected to the gateway system 40 through various types of networks, respectively.

In this case, the data generated between the lighting apparatus 21 and the gateway system 40 may be transceived through various types of networks having mutually different bandwidths.

In this case, the various types of networks may include at least one among ZigBee, Bluetooth, Z-wave and Wi-Fi according to coverage of the gateway system 40.

The lighting apparatus 21 may include one among plural surface light sources, a lamp and a down-light used in home or an office.

In addition, the lighting apparatus 21 may include a communication module 22. The communication module 22 may be connected to the gateway system 40 to wirelessly transceive data.

Hereinafter, a configuration of the lighting apparatus 21 will be described in detail.

As shown in FIG. 1, the gateway system 40 may include a wireless communication unit 41 and a server 42.

The wireless communication unit 41 wirelessly transmits a control signal to the lighting apparatus 21.

The wireless communication unit 41 includes at least one gateway apparatus.

The server 42 is connected to the wireless communication unit 41 and the external communication network. The server 42 stores an output signal of the lighting apparatus 21 to be transmitted to the wireless communication unit 41. In addition, the server 42 stores a control signal transmitted from the wireless communication unit 41.

The server 42 may further include a storage unit (not shown) for storing the output signal and the control signal.

The server 42 is connected to the light control apparatus through a cloud network as the external network, so that the server 42 may receive a signal transmitted from the light control apparatus, thereby controlling the lighting apparatus 21.

Meanwhile, when the gateway system 40 does not include a server, each gateway apparatus may include an additional memory for storing the output signal and the control signal.

In addition, the plurality of gateway apparatus is connected to each other through Ethernet.

As shown in FIG. 2, the lighting system performs a procedure of registering the unique address of the lighting apparatus 21.

The registering of the lighting apparatus signifies that the place of the lighting apparatus 21 is confirmed on a map showing a light installation place, the confirmed place and the unique address of the communication module installed in the lighting apparatus 21 are matched with each other, and the confirmed place and the unique address matched with each other are stored.

In this case, the unique address of the lighting apparatus 21 may include MAC (Media Access Control) of the communication module installed in the lighting apparatus 21.

Thus, according to the embodiment, address information S1 about the unique address of the lighting apparatus 21 is provided on an outer surface of the lighting apparatus 21. The address information S1 may include code information 24 about the unique address of the lighting apparatus.

Figure 3A:
FIGS. 3a and 3b are views illustrating a code of the lighting apparatus of FIG. 2.
Figure 3B:
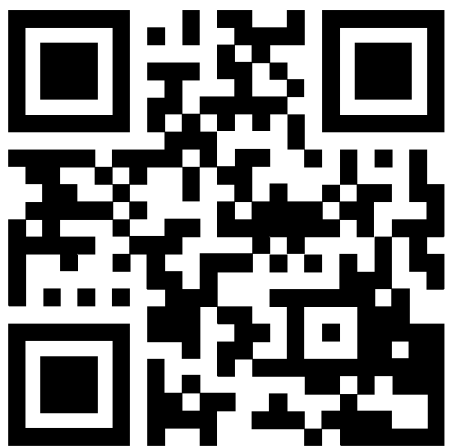

The code information 24 may be a bar code as shown in FIG. 3a, and to the contrary, may be a QR (Quick Response) code signifying a unique address as shown in FIG. 3b.

The code information 24 is provided on the outer surface of the lighting apparatus 21 such that the code information 24 is easily readable from an outside. As shown in FIG. 2, the code information may be formed on the communication module 22 which is detachable from the lighting apparatus 21.

As shown in FIG. 2, a user installs a receiver 30 near the code information 24 of the lighting apparatus 21 and obtains the code information included in the lighting apparatus 21 by using the receiver 30.

The receiver 30 has a function of reading the code information 24, so that the address information S1 included in the code information 24 may be extracted. Thus, the unique address of the lighting apparatus 21 may be registered.

Hereinafter, the lighting apparatus 21 having code information 24 corresponding to the address information S1 will be described.

Referring to FIG. 4, the lighting apparatus 21 according to the embodiment includes a modulating unit 23, a dimming unit 25, a control unit 27 and a light source 29.

The light source 29 may include a plurality of light emitting diodes or a fluorescent lamp.

The modulating unit 23 modulates a control signal for controlling an operation of the lighting apparatus 21.

The dimming unit 25 receives a dimming signal from an outside thereof and processes the dimming signal to transfer the dimming signal to the control unit 27.

The control unit 27 receives the modulated control signal by the modulating unit 23 and the dimming signal from the dimming unit 25.

The control unit 27 processes the modulated control signal and the dimming signal to generate an on/off signal for controlling an operation of the light source 29.

The control unit 27 may be a power circuit for controlling the light source 29.

Thus, the light source 29 emits light by performing an on/off operation according to the on/off signal transferred through the control unit 27.

Meanwhile, the lighting apparatus 21 may further include a communication module 22. As shown in FIG. 2, the communication module 22 may be detachably attached to the lighting apparatus 21.

The communication module 22 communicates with the gateway system 40 or the communication module attached to another lighting apparatus neighbored therewith to receive the control signal and transfers the received control signal to the control unit 27.

The communication module 22 includes an antenna therein, and uses the antenna to receive the control signal transmitted from an outside and to transmit the received control signal to the control unit 27.

The communication module 22 may include a communication integrated circuit for analyzing the control signal according to a kind of the wireless network. One specific communication integrated circuit may be selected among a plurality of communication integrated circuits according to a wireless network environment and the selected communication integrated circuit may be mounted on the communication module 22.

The communication integrated circuit may support at least one of ZigBee, Z-wave, Wi-Fi and Bluetooth communication schemes.

The code information 24 is formed on an outer surface of a body of the communication module.

The communication module 22 is detachably coupled to a lighting apparatus installed at a specific place.

Thus, when the lighting apparatus installed at the specific place is exchanged, after the communication module 22 is separated from the lighting apparatus, the separated communication module 22 may be attached again to a new lighting apparatus installed at the specific place.

For this reason, even when the lighting apparatus is exchanged due to a failure of the lighting apparatus, the communication module 22 for communicating with the lighting apparatus may be continuously used, so that the registering process for the purpose of communication with the exchanged new lighting apparatus may be omitted.

In other words, the register of the lighting apparatus is implemented by matching the unique address of the communication module 22 attached to the lighting apparatus with the information about the installed location of the lighting apparatus.

In this case, since the communication module 22 is maintained even through the lighting apparatus is exchanged due to a failure of the light source 29 or the control unit 27, the communication module 22 installed at a specific place and the information about the specific place matched with the communication module 22 may be maintained.

Meanwhile, the receiver 30 may have a configuration as shown in FIG. 5.

Referring to FIG. 5, the receiver 30 includes a reader unit 31 and a control unit 35.

The reader unit 31 may include a camera module or a scanner and may extract a unique address from a photographed image.

Preferably, the reader unit 31 photographs the communication module 22 of the lighting apparatus to obtain an image including code information formed on the communication module 22 and extracts the address information S1 about the unique address of the communication module 22 corresponding to the code information by using the obtained image.

The reader unit 31 may store a smart phone application or program downloaded and may be a processor for executing the stored application or program.

The control unit 35 receives the address information S1 obtained through the reader unit 31 and performs an operation of registering the lighting apparatus attached to the communication module 22 by using the address information S1.

In this case, a map including location information about the entire space in which a plurality of lighting apparatus is installed is stored in the control unit 35. If a specific place is selected on the map, the obtained address information about the communication module 22 matched with the selected place is stored.

In addition, when the receiver 30 includes a communication unit 37, the receiver 30 transmits register information S2 about the lighting apparatus to the gateway through the communication unit 37.

In this case, the register information S2 includes location information of the lighting apparatus (which is location information about a place at which the lighting apparatus is practically positioned on the map showing the entire space) and the address information obtained through the reader 31.

Hereinafter, the lighting apparatus 21 as shown in FIGS. 4 and 5 and the registering of the lighting apparatus 21 having the receiver 30 will be described with reference to FIGS. 6 to 8.

Figure 6:
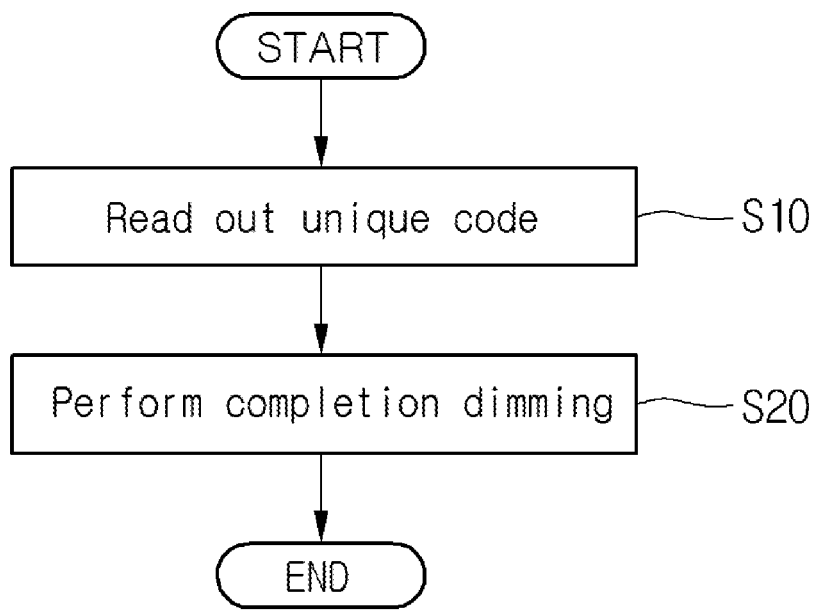
FIG. 6 is a flowchart illustrating an operation of a lighting apparatus according to an embodiment.

FIG. 6 is a flowchart illustrating an operation of the lighting apparatus 21 according to an embodiment. FIG. 7 is a view illustrating a step of registering a lighting apparatus according to an embodiment. FIG. 8 is a view illustrating a receiver to which a lighting apparatus is registered according to an embodiment.

Figure 7:
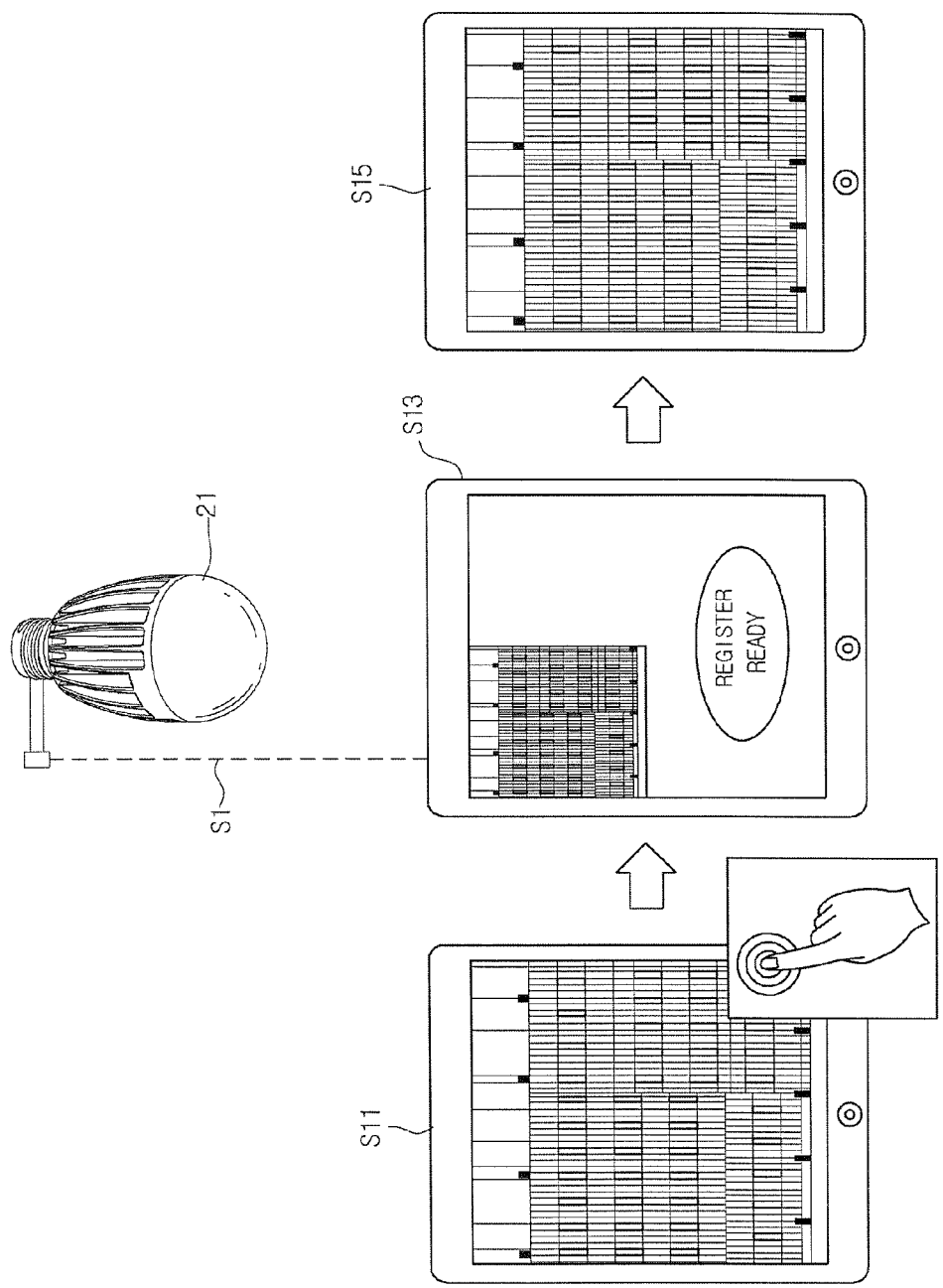
FIG. 7 is a view illustrating a step of registering a lighting apparatus according to an embodiment.
Figure 8:
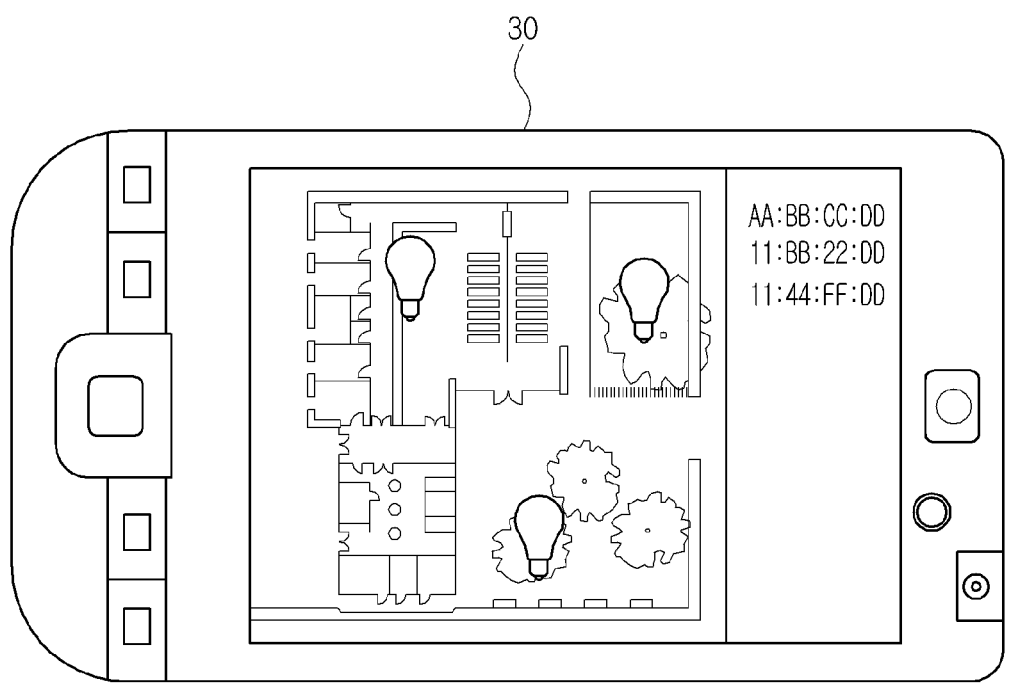
FIG. 8 is a view illustrating a receiver to which a lighting apparatus is registered according to an embodiment.

First, when a step S10 of registering a lighting apparatus starts, as shown in FIG. 7, the map including information about an installation space of a lighting apparatus is displayed through the receiver 30 and in step S11, the location at which the lighting apparatus 21 to be registered is installed is selected on the displayed map.

When the location at which the lighting apparatus 21 to be registered is installed is selected in the receiver 30, the receiver 30 is moved to and installed at the location at which the lighting apparatus is practically installed. Thus, the code information 24 formed in the communication module 22 of the lighting apparatus 21 is obtained in step S13.

In step S15, the receiver 30 reads out the information S1 about the unique address of the communication module 22 attached to the lighting apparatus by using the code information 24 obtained from the leader 31.

When the receiver 30 obtains the unique address information, the receiver 30 stores the obtained unique address and the information about the location selected on the map so that the lighting apparatus is registered.

That is, the receiver 30 matches the obtained unique address with the information about the location selected on the map and stores the unique address and the location information, so that the register of the lighting apparatus 21 is performed.

In addition, when the receiver 30 includes the communication unit 37, the receiver 30 transmits the register information S2 including the location information and the unique address information to the gateway apparatus.

When the register of the lighting apparatus 21 is completed, the gateway system 40 controls the lighting apparatus 21 to emit light in a dimming operation for register confirmation in step S20.

That is, for the purpose of allowing a user to visually confirm whether the lighting apparatus 21 is normally registered, the gateway system 40 transmits a flicker dimming signal to the lighting apparatus 21 by using the received location information and unique address information.

The lighting apparatus 21 receives the flicker dimming signal and performs the flicker dimming operation.

As described above, according to the embodiment, in the step of registering a lighting apparatus, the address information S1 is obtained from the code information provided on the communication module 22 of the lighting apparatus 21 and the register of the lighting apparatus 21 is performed by using the obtained address S1, so that the time taken for a user to manually input the address information and the cost incurred therefrom may be reduced.

Meanwhile, although the gateway apparatus and the receiver are configured separately from each other, the receiver may be included in the gateway apparatus.

In addition, the receiver may be called a lighting registering apparatus.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A lighting apparatus comprising:
    a lighting unit receiving a control signal to emit light according to the control signal; and
    a communication module that is physically separable from the lighting unit, wherein the communication module receives the control signal transmitted from an external source and transfers the control signal to the lighting unit;

wherein the communication module comprises:

an identifying unit, separable from the lighting unit, disposed on an outer surface of a body of the communication module, and including identifying information for identifying a unique address of the lighting apparatus;

wherein the identifying information includes a Media Access Control address (MAC) of the communication module installed in the lighting unit;

wherein a register of the lighting apparatus is implemented by determining whether the MAC of the communication module attached to the lighting apparatus matches installation location information of the lighting unit;

wherein the identifying information of the lighting apparatus and the register of the lighting apparatus are maintained when the lighting unit of the lighting apparatus is replaced by a new lighting unit; and wherein, when the communication module of the lighting apparatus is replaced by a new communication module, the identifying information of the lighting apparatus and the register of the lighting apparatus are changed based on a new MAC of the new communication module.

2. The lighting apparatus of claim 1, wherein the identifying unit includes at least one of a bar code and a quick response code printed on the outer surface of the communication module.

3. The lighting apparatus of claim 1, wherein the communication module receives a dimming signal transmitted from the external source for confirming a registration of the lighting apparatus and transfers the dimming signal to the lighting unit, and wherein the lighting unit performs a dimming operation according to the dimming signal transmitted from the communication module.

4. A lighting system comprising:

a lighting apparatus having identification information for identifying a unique address, wherein the identification information is formed as an image and is disposed on an outer surface of a body of the lighting apparatus; and a lighting registering apparatus configured to scan or photograph the identification information disposed on the outer surface of the body of the lighting apparatus to obtain information of the unique address of the lighting apparatus, and to match the obtained unique address information with installation location information of the lighting apparatus to perform a registration of the lighting apparatus;

wherein the lighting apparatus comprises a lighting unit and a communication module that is physically separable from the lighting unit;

wherein the identification information is disposed on an outer surface of a body of the communication module;

wherein the identification information includes a Media Access Control address of the communication module installed in the lighting unit;

wherein a register of the lighting apparatus is implemented by determining whether the MAC of the communication module attached to the lighting apparatus matches installation location information of the lighting unit;

wherein the identifying information of the lighting apparatus and the register of the lighting apparatus are maintained when the lighting unit of the lighting apparatus is replaced by a new lighting unit; and wherein, when the communication module of the lighting apparatus is replaced by a new communication module, the identifying information of the lighting apparatus and the register of the lighting apparatus are changed based on a new MAC of the new communication module.

5. The lighting system of claim 4, wherein the lighting registering apparatus displays a map including location information about an entire space where the lighting apparatus is installed, receives a selection of a location of the lighting apparatus to be registered on the displayed map, and confirms location information of the lighting apparatus according to the selected location.

6. The lighting system of claim 5, wherein the lighting registering apparatus generates and stores register information of the lighting apparatus including the confirmed location information of the lighting apparatus and the unique address obtained from the lighting apparatus.

7. The lighting system of claim 6, wherein the lighting registering apparatus further comprises a communication unit to transmit the stored register information to a gateway apparatus.

8. The lighting system of claim 7, wherein the gateway apparatus transmits a signal for confirming whether the lighting apparatus is normally registered by using the register information to the lighting apparatus, and wherein the lighting apparatus performs a dimming operation by a signal transmitted from the gateway apparatus.

9. The lighting system of claim 4, wherein the lighting apparatus further comprises:

an identifying unit disposed on the outer surface of the communication module to include the identification information for identifying the unique address.

10. The lighting system of claim 9, wherein the identifying unit includes at least one of a bar code and a quick response (QR) code formed on the outer surface of the communication module.

11. A method of registering a lighting apparatus, the method comprising:

obtaining identification information for identifying information of a unique address of a lighting apparatus disposed on an outer surface of the lighting apparatus;

extracting information of the unique address of the lighting apparatus by using the obtained identification information; and matching the information of the extracted unique address with information of a location at which the lighting apparatus is installed to register the lighting apparatus, wherein the identification information is formed as an image disposed on an outer surface of a body of a communication module of the lighting apparatus;

wherein the lighting apparatus includes a lighting unit to emit light;

wherein the communication module is physically separable from the lighting unit and selectively detachable from the lighting unit;

wherein the identification information includes a Media Access Control address of the communication module installed in the lighting unit;

wherein a register of the lighting apparatus is implemented by determining whether the MAC of the communication module attached to the lighting apparatus matches installation location information of the lighting unit;

wherein the identifying information of the lighting apparatus and the register of the lighting apparatus are maintained when the lighting unit of the lighting apparatus is replaced by a new lighting unit; and wherein, when the communication module of the lighting apparatus is replaced by a new communication module, the identifying information of the lighting apparatus and the register of the lighting apparatus are changed based on a new MAC of the new communication module.

12. The method of claim 11, further comprising displaying a map including location information of an entire space where a plurality of lighting apparatuses are installed, and selecting a location at which the lighting apparatus is installed, wherein the information of the location of the lighting apparatus is information of a location selected from the map.

13. The method of claim 11, further comprising transmitting register information of the lighting apparatus to a gateway apparatus, wherein the register information includes the information of the unique address of the lighting apparatus and the information of the location at which the lighting apparatus is installed.

14. The method of claim 13, further comprising transmitting a register confirmation signal from the gateway apparatus to the lighting apparatus by the transmitted register information; and performing a dimming operation by the lighting apparatus according to the transmitted register confirmation signal.

* * * * *